Feb. 7, 1933. L. J. ARMSTRONG 1,896,994
WINDSHIELD WIPER
Filed Feb. 17, 1931 2 Sheets-Sheet 2
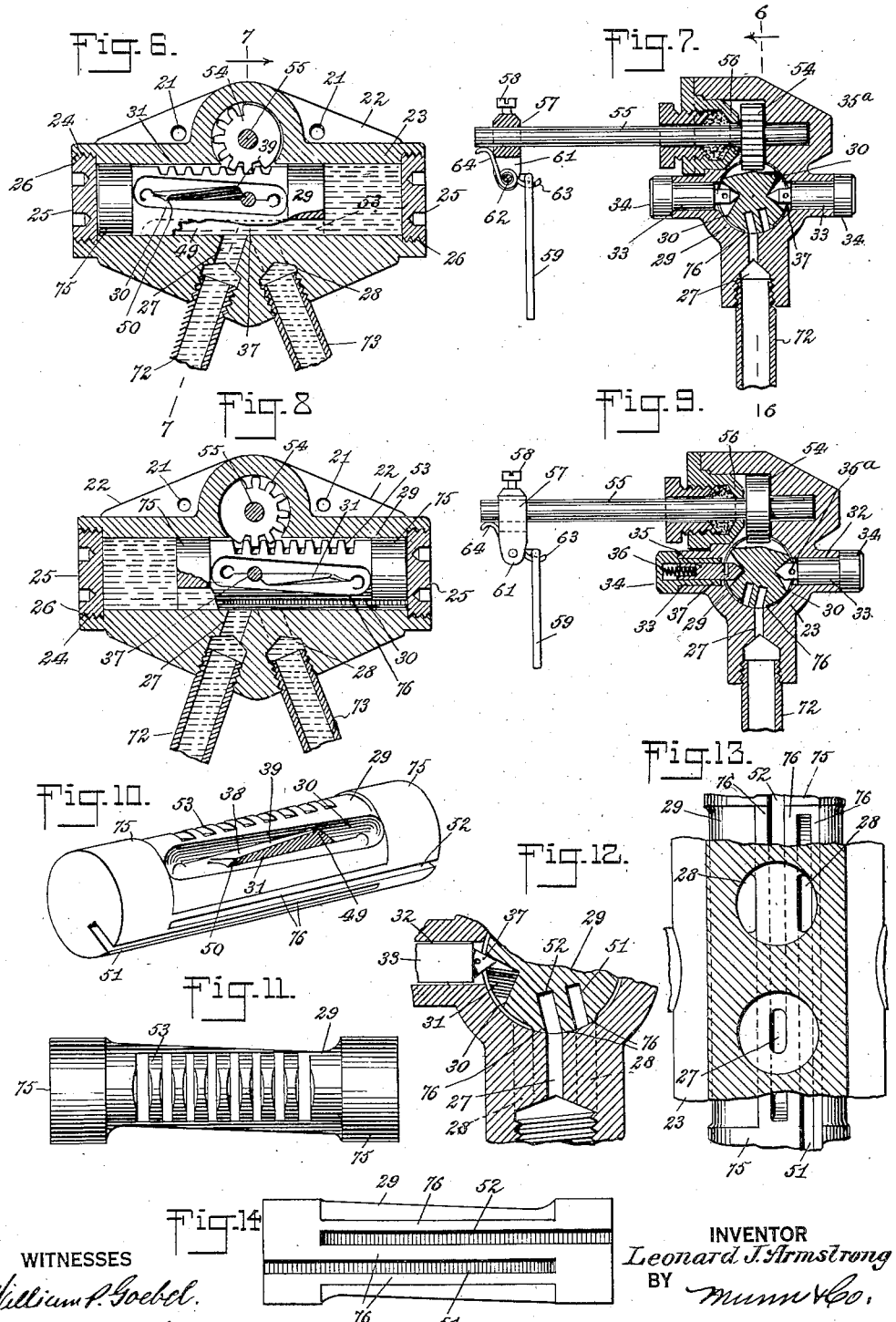
INVENTOR
Leonard J. Armstrong
BY
Munn & Co.
ATTORNEYS
WITNESSES
William P. Goebel
E. B. Marshall Patented Feb. 7, 1933

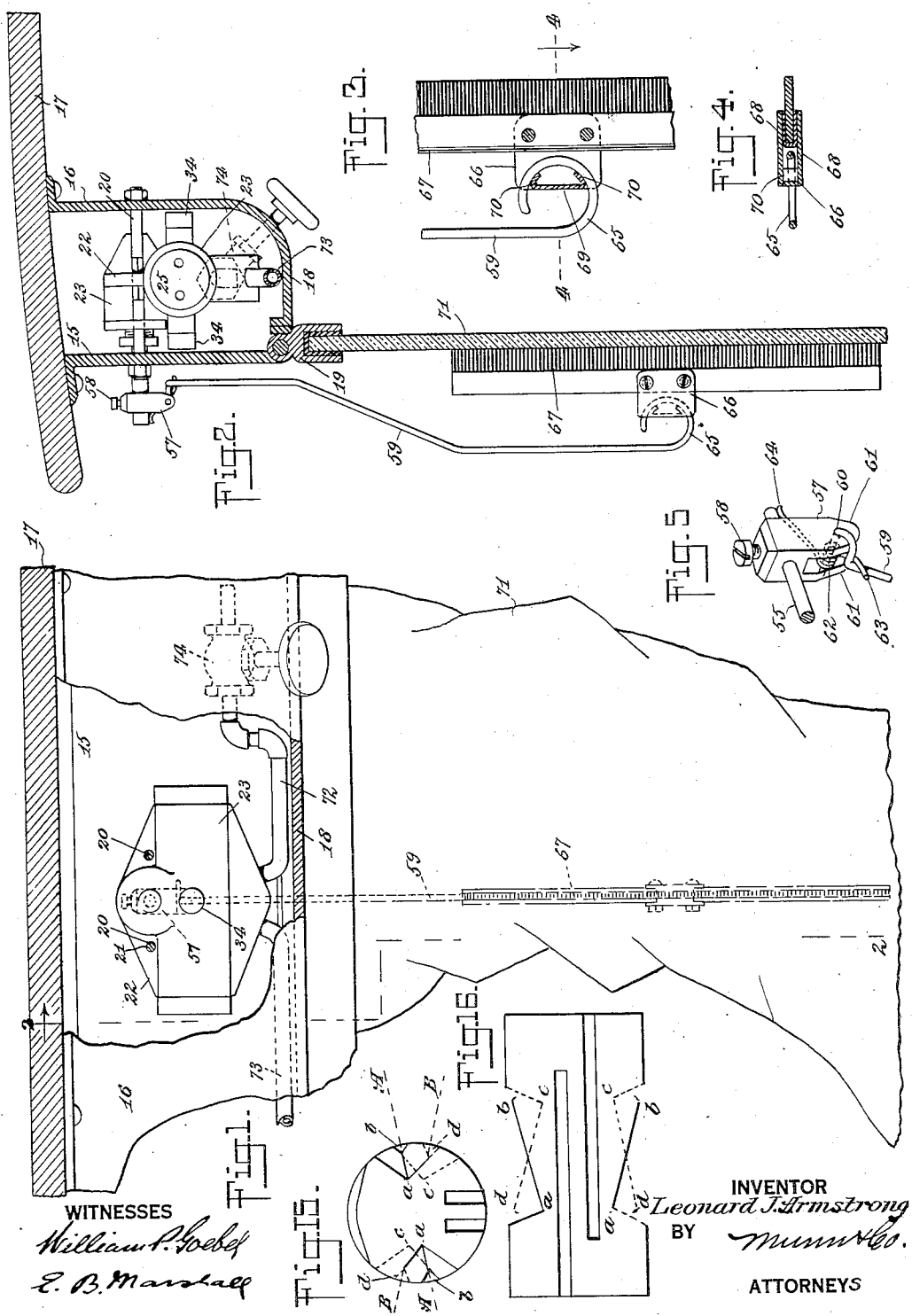

1,896,994

UNITED STATES PATENT OFFICE

LEONARD J. ARMSTRONG, OF MARINERS HARBOR, NEW YORK

WINDSHIELD WIPER

Application filed February 17, 1931. Serial No. 516,450.

An object of the invention is to provide a windshield wiper of novel construction operable by fluid pressure or suction.

Another object of the invention is to provide a piston in a cylinder for operating the windshield wiper, means being provided for periodically rocking the piston to connect ports in the cylinder with passages in the piston leading in the direction of the cylinder heads.

Still another object of the invention is to provide a groove extending longitudinally in the periphery of the piston, which is engaged by a member extending from the cylinder to rock the piston. Preferably, the groove extends at an angle to the axis of the piston, the groove being V-shaped in cross-section and having a vane extending longitudinally of the piston and at an angle to the groove, the member on the cylinder being spring-pressed to travel up and off the vane to rock the piston as the member passes to the bottom of the V-shaped groove, the member then moving in a similar manner at the other side of the vane. Preferably, the device is provided with two similar grooves at its opposite sides and the cylinder is provided with two spring-pressed members which travel in the grooves.

A further object of the invention is to provide the piston with rack teeth which mesh with a gear having means to operate the wiper.

Still further objects of the invention are to provide novel means for mounting the wiper member and also to provide novel means which are operated by the gear, as well as to provide novel means for mounting the complete device on an automotive vehicle.

Additional objects of the invention will appear in the following specification in which the preferred form of the invention is described.

In the drawings similar reference characters refer to similar parts in all the views, of which Figure 1 is a fragmentary sectional view illustrating the manner in which the device is mounted on an automotive vehicle, Figure 2 is a sectional view on the line 2—2 of Figure 1, Figure 3 is an enlarged sectional view illustrating the manner in which the wiper is mounted on the operating rod, Figure 4 is a sectional view on the line 4—4 of Figure 3, Figure 5 is an enlarged sectional view illustrating the manner in which the operating rod is mounted on the shaft, Figure 6 is an enlarged sectional view showing the operating piston in the cylinder, the view being taken on the line 6—6 of Figure 7, Figure 7 is a sectional view on the line 7—7 of Figure 6, Figure 8 is a view similar to the view illustrated in Figure 6, but with the piston at the other end of the cylinder, Figure 9 is a view similar to the view illustrated in Figure 7, but with the piston rocked to connect its other passage with the inlet port, Figure 10 is an enlarged perspective view illustrating the piston, Figure 11 is a plan view of the piston, Figure 12 is an enlarged fragmentary sectional view illustrating the spring-pressed member on the cylinder engaging a cam groove, Figure 13 is an inverted sectional fragmentary view illustrating the inlet port and the exhaust ports in the cylinder and the passages in the piston, Figure 14 is a view of the piston illustrating the passages therein, and Figures 15 and 16 are diagrammatic views illustrating grooves in the piston and the vanes in the grooves.

By referring to the drawings it will be seen that casing members 15 and 16 are secured to the top 17 of the automotive vehicle and that the bottom of the casing member 16 extends forwardly at 18 and is secured, as well as the bottom of the casing member 15, to the windshield 19 in any desired manner. Two bolts 20 extend through orifices in the casing members 15 and 16, the said bolts 20 extending through orifices 21 in flanges 22 which extend from the cylinder 23. The cylinder 23 has threaded openings 24 at its ends which are closed by heads 25 which have threads 26 meshing with the threads 24.

As will best be seen by referring to Figure 13 of the drawings, the cylinder 23 has an inlet port 27 and two outlet ports 28 which are spaced apart and which are disposed out of alignment with the inlet port 27. In the cylinder 23 there is disposed a piston 29, this piston 29 having at opposite sides cam grooves 30, the cam grooves 30 being disposed in the periphery of the piston 29 and extending longitudinally, the cam grooves 30 being inclined in opposite directions, as shown in Figures 10, 15 and 16. In each cam groove 30 there is a vane 31 which is disposed at an angle to the cam groove 30 and which is approximately parallel with the axis of the piston, the vane 31 extending substantially from one side of the cam groove 30 to the opposite side of the cam groove. The vanes 31 are each spaced from each end of the cam grooves 30.

As will be seen by referring to Figures 7 and 9, there is a channel 32 at each side of the cylinder 23 and in each of these channels there is disposed a casing 33 having a head 34, there being disposed in each of the casings 33 a member 35 which is held yieldingly extended by a spring 36 disposed in the casing 33 against the head 34. These members 35 have pointed ends 37 for traveling in the cam grooves 30, the said cam grooves, as shown in Figures 7 and 9, being V-shaped in cross-section so that, when the pointed end 37 of one of the members 35 travels along the face 38 of the vane 31 to the end 39 of the vane, with the continued movement of the piston 29 the pointed end 37 of the member 35 will pass the vane and move down the V-shaped cam groove 30 to rock the piston 29 in the cylinder 23, the pointed end 37 of the member 35 then traveling along the side face 49 of the vane 31, where it will pass the end 50 of the vane 31 to engage the V-shaped cam groove 30 to pass to the bottom of the said groove 30 which will rock the piston 29 in the opposite direction. Referring to Figures 15 and 16 it will be seen that the members 35 are forced into the bottom of the grooves 30 by the springs 36, as shown at $a$. This brings the ports into position and the members 35 ride up the inclines at the vanes 31 to $b$ where they leave the vanes 31 and are forced into the bottoms of the grooves at $c$. The piston has now revolved to B—B from A—A and when the piston moves in the opposite direction the springs 36 will force the members 35 off the ends of the vanes 41 to $d$ to revolve the piston to A—A. It will be understood that either member 35 will rock the piston 29, but two members 35 are preferably employed to reduce the side thrust and friction. The members 35 preferably have holes 35$^a$ to permit oil to escape which may be trapped.

The piston 29 has two longitudinally extending passages 51 and 52 in its periphery, one of these passages extending through one end of the piston and the other passage extending through the other end of the piston, these passages being disposed for communicating with the inlet port 27 and the exhaust ports 28. It will be understood that, with the piston 29 disposed in the cylinder in the position shown in Figure 13, the passage 51 will communicate with one of the exhaust ports 28, while the passage 52 will communicate with the inlet port 27. This will permit the fluid under pressure to pass through the passage 52 to one end of the cylinder and the pressure at the said end of the cylinder will serve to move the piston away from the said end of the cylinder, when the piston will be rocked in the manner described to move the passage 52 to communicate with the exhaust port 28 and the passage 51 to communicate with the inlet port 27. In this manner the piston 29 will be reciprocated in the cylinder.

As will be seen by referring to the drawings, the piston 29 is provided with rack teeth 53 which mesh with teeth on a gear 54, the said gear 54 being secured to a shaft 55 which is journaled in a bearing 56 in the cylinder casing and which is provided with a suitable packing means.

Mounted on the shaft 55 there is a head 57 which is preferably held in position on the shaft 55 by a set screw 58, a terminal of a rod 59 being bent and being disposed in orifices 60 in flanges 61 of the head 57, a wire 62 being wound on the terminal of the rod 59 between the said flanges 61 and having an end 63 bent over the rod 59, as best shown in Figure 5, this means being provided for holding the rod 59 extended. The other end 64 of the spring 62 is preferably disposed against the shaft 55, as shown in Figure 5. By this means the rod 59 is held yieldingly in position, the lower terminal of this rod 59 having a curved hook 65 which is disposed in a looped member 66 on the wiper 67. As will be seen by referring to Figure 4, the curved hook 65 of the rod is not firmly engaged by the sides 68 of the looped portions 66 of the wiper so that the wiper may rock on a vertical axis. It will also be seen that the outer side 69 of the looped portions 66 of the wiper 67 is inwardly curved at its top and bottom, as shown at 70, so that the looped portions 66 of the wiper may have a rocking movement on a horizontal axis. By this construction the wiper will have considerably free movement relatively to the rod 59 as the wiper 67 is moved back and forth before the windshield glass 71.

By referring to Figure 1 of the drawings it will be seen that there is a pressure or suction pipe 72 leading from some portion of the automotive engine to the inlet port 27 and there is a pipe 73 leading from the exhaust ports 28, there being a valve 74 in the pipe which may be opened or closed, as desired, to operate or to stop the operation of the device.

As will best be seen by referring to Figures 11, 12, and 13, the piston 29 is of reduced diameter between its heads 75 to space the central portion of the piston 29 from the cylinder 23 except at points adjacent its channels 51 and 52. Oil may pass from the rack teeth 53 and the gear 54 to the cylinder 23 between the piston heads 75 and this oil may escape through the ports 28, the ribs 76 between the passages 51 and 52 and at the outer sides of the said passages, preventing the oil from entering the port 27.

What is claimed is:

1. In a device of the class described, a cylinder with heads and having inlet and exhaust ports, a piston for reciprocating in the cylinder, the piston having at its periphery a cam means inclined laterally longitudinally of the axis of the piston, a member on the cylinder for engaging the cam means for rocking the piston in the cylinder, the piston having passages for connecting the ports with the cylinder adjacent the cylinder heads, and means for holding the member out of active engagement with the cam means during a predetermined portion of the stroke of the piston.

2. In a device of the class described, a cylinder with heads and inlet and exhaust ports, a piston for reciprocating in the cylinder, the piston having a cam groove in its periphery inclined laterally relatively to the axis of the piston, a vane in the cam groove disposed at an angle to sides of the cam groove and spaced from the ends of the cam groove, a spring-pressed member in the cylinder for movement along the vane and in the groove for rocking the piston in the cylinder, there being passages in the piston leading to the interior of the cylinder which serve to connect the ports with the cylinder at its heads at each rocking movement of the piston.

3. In a device of the class described, a cylinder with heads and inlet and exhaust ports, a piston for reciprocating in the cylinder, the piston having a cam groove in its periphery, the cam groove being V-shaped in a cross-section and being inclined longitudinally, a vane in the cam groove disposed at an angle to the sides of the cam groove, a spring-pressed member in the cylinder for movement along the vane and in the groove for rocking the piston in the cylinder, there being passages in the piston leading to the interior of the cylinder which serve to connect the ports with the cylinder at its heads at the end of each rocking movement of the piston.

4. In a device of the class described, a cylinder with heads and inlet and exhaust ports, a piston for reciprocating in the cylinder, the piston having a cam groove in its periphery, the cam groove being V-shaped in cross-section and extending at an angle to the axis of the piston, a vane in the cam groove disposed at an angle thereto, a spring-pressed member in the cylinder for movement along the vane and in the groove for rocking the piston in the cylinder, there being passages in the piston leading to the interior of the cylinder which serve to connect the ports with the cylinder at its heads at the end of each rocking movement of the piston, the piston having rack teeth, and a gear meshing with the rack teeth.

5. In a device of the class described, a cylinder with heads and inlet and exhaust ports, a piston for reciprocating in the cylinder, the piston having opposite longitudinally extending cam grooves in its periphery inclined laterally relatively to the axis of the piston, vanes in the cam grooves disposed at angles to the sides of the cam grooves and spaced from the ends of the cam grooves respectively, spring-pressed members on the cylinders for movement along the vanes and in the grooves for rocking the piston in the cylinder, there being passages in the piston leading to the interior of the cylinder which serve to connect the ports with the cylinder at its heads.

6. In a device of the character described, a cylinder with heads and having inlet and exhaust ports, a piston for reciprocating in the cylinder, the piston having at its periphery opposite cam means extending longitudinally of the piston and inclined laterally relatively to the axis of the piston, members on the cylinder for engaging the cam means for rocking the piston in the cylinder, the piston having passages for connecting the ports with the cylinder adjacent the cylinder heads, and means for holding the members out of active engagement with the cam means during a predetermined portion of the stroke of the piston.

7. In a device of the class described, a cylinder with heads and having inlet and exhaust ports, a piston for reciprocating in the cylinder having at its periphery a cam groove extending longitudinally and being laterally inclined relatively to the axis of the piston, the ends of the cam groove being approximately V-shaped in cross section, a vane in the cam groove spaced from the said ends of the cam groove, the vane extending approximately parallel with the axis of the piston and at an angle to the cam groove, the vane forming with the side walls of the cam groove between its ends two channels which lead from the ends of the cam groove and which are parallel with each other and with the axis of the piston, a spring-pressed member in the cylinder for moving along the vane and in the groove for rocking the piston in the cylinder, there being passages in the piston leading to the interior of the cylinder which serve to connect the ports with the cylinder adjacent the cylinder heads at the end of each rotary movement of the piston.

8. In a device of the class described, a cylinder with heads and having inlet and exhaust ports, a piston for reciprocating in the cylinder having at its periphery a cam groove extending longitudinally and being laterally inclined relatively to the axis of the piston, the cam groove being approximately V-shaped in cross section, a vane in the cam groove spaced from the ends of the cam groove, the vane extending approximately parallel with the axis of the piston and at an angle to the cam groove, with the vane adjacent one end of the cam groove extending up one side of the cam groove and the vane adjacent the other end of the cam groove extending up the other side of the cam groove, a spring-pressed member in the cylinder for moving between the vane and the sides of the cam groove for rocking the piston in the cylinder, there being passages in the piston leading to the interior of the cylinder which serve to connect the ports with the cylinder adjacent the cylinder heads at the end of each rocking movement of the piston.

9. In a device of the class described, a cylinder, a piston for reciprocating in the cylinder having at its periphery a cam groove extending longitudinally and being laterally inclined relatively to the axis of the piston, the ends of the cam groove being approximately V-shaped in cross section, a vane in the cam groove spaced from the said ends of the cam groove, the vane extending approximately parallel with the axis of the piston and at an angle to the cam groove, the vane forming with the side walls of the cam groove between its ends two channels which lead from the ends of the cam groove and which are parallel with each other and with the axis of the piston, and a spring-pressed member in the cylinder for moving along the vane and in the groove for rocking the piston in the cylinder.

10. In a device of the class described, a cylinder, a piston for reciprocating in the cylinder and having at its periphery a cam groove extending longitudinally and being laterally inclined relatively to the axis of the piston, the cam groove being approximately V-shaped in cross section, a vane in the cam groove spaced from the ends of the cam groove, the vane extending approximately parallel with the axis of the piston and at an angle to the cam groove, with the vane adjacent one end of the cam groove extending up one side of the cam groove and the vane adjacent the other end of the cam groove extending up the other side of the cam groove, and a spring-pressed member in the cylinder for moving between the vane and the sides of the cam groove for rocking the piston in the cylinder.

LEONARD J. ARMSTRONG.